US008969234B2

(12) United States Patent
Kim et al.

(10) Patent No.: US 8,969,234 B2
(45) Date of Patent: *Mar. 3, 2015

(54) METHOD FOR PREPARING FUEL CELL ELECTRODE CATALYST BY SIMULTANEOUS EVAPORATION, METHOD FOR PREPARING FUEL CELL ELECTRODE COMPRISING CATALYST PREPARED THEREBY AND FUEL CELL COMPRISING THE SAME

(71) Applicant: Korea Institute of Energy Research, Daejeon (KR)

(72) Inventors: Hee-Yeon Kim, Daejeon (KR); Seok-yong Hong, Daejeon (KR)

(73) Assignee: Korea Institute of Energy Research, Daejeon (KR)

( * ) Notice: Subject to any disclaimer, the term of this patent is extended or adjusted under 35 U.S.C. 154(b) by 0 days.

This patent is subject to a terminal disclaimer.

(21) Appl. No.: 13/912,888

(22) Filed: Jun. 7, 2013

(65) Prior Publication Data
US 2013/0344413 A1 Dec. 26, 2013

(30) Foreign Application Priority Data

Jun. 20, 2012 (KR) .................. 10-2012-0066013

(51) Int. Cl.
*H01M 4/88* (2006.01)
*B01J 21/18* (2006.01)
(Continued)

(52) U.S. Cl.
CPC .............. *H01M 4/923* (2013.01); *H01M 4/926* (2013.01); *Y02E 60/50* (2013.01); *H01M 2008/1095* (2013.01)
USPC ........... 502/101; 502/185; 428/403; 427/115; 427/122; 427/212; 427/216; 427/220; 427/226; 427/228; 427/249.1; 427/255.23; 427/255.28; 427/255.6

(58) Field of Classification Search
USPC ........... 502/101, 185; 428/403; 427/115, 122, 427/212, 216, 220, 226, 228, 249.1, 255.23, 427/255.28, 255.6
See application file for complete search history.

(56) References Cited

U.S. PATENT DOCUMENTS 4,482,641 A * 11/1984 Wennerberg .................. 502/182
5,318,797 A *  6/1994 Matijevic et al. ........ 427/213.31
(Continued)

FOREIGN PATENT DOCUMENTS

KR           100823502 B1    4/2008
WO    WO 2008070482 A2 *  6/2008  .............. H01M 4/92

OTHER PUBLICATIONS

M. Bystrzejewski et al.: "Continuous Synthesis of Carbon-Encapsulated Magnetic Nanoparticles with a Minimum Production of Amorphous Carbon", Carbon, vol. 47, pp. 2040-2048 (2009).
(Continued)

*Primary Examiner* — Patricia L Hailey
(74) *Attorney, Agent, or Firm* — Brian R. Morrison; Westerman, Champlin & Koehler, P.A.

(57) ABSTRACT

A method of preparing a fuel cell electrode catalyst by preparing a platinum-carbon core-shell composite, which has a platinum nanoparticle core and a graphene carbon shell, using a simultaneous evaporation process, a method for preparing a fuel cell electrode comprising the catalyst prepared thereby, and a fuel cell comprising the same. A fuel cell comprising an electrode catalyst consisting of the core-shell composite prepared by simultaneously evaporating the platinum precursor and the organic precursor can have high performance and high durability, because the platinum particles are not agglomerated or detached and corroded even under severe conditions, including high-temperature, long use term, acidic and alkaline conditions.

17 Claims, 5 Drawing Sheets

(51) Int. Cl.
*B01J 23/40* (2006.01)
*B01J 23/74* (2006.01)
*B32B 5/16* (2006.01)
*B32B 9/00* (2006.01)
*B32B 15/02* (2006.01)
*B32B 17/02* (2006.01)
*B32B 19/00* (2006.01)
*B32B 21/02* (2006.01)
*B32B 23/02* (2006.01)
*B32B 27/02* (2006.01)
*B05D 3/02* (2006.01)
*B05D 5/12* (2006.01)
*B05D 7/00* (2006.01)
*C23C 16/00* (2006.01)
*H01M 4/92* (2006.01)
*H01M 8/10* (2006.01)

(56) References Cited

U.S. PATENT DOCUMENTS

| | | | |
|---|---|---|---|
| 6,103,393 A * | 8/2000 | Kodas et al. | 428/570 |
| 6,284,654 B1 | 9/2001 | Roeder et al. | |
| 6,635,348 B1 * | 10/2003 | Hampden-Smith et al. | 428/402 |
| 6,660,680 B1 * | 12/2003 | Hampden-Smith et al. | 502/180 |
| 6,906,000 B1 * | 6/2005 | Ganguli et al. | 502/180 |
| 6,967,183 B2 * | 11/2005 | Hampden-Smith et al. | 502/101 |
| 7,053,021 B1 * | 5/2006 | Zhong et al. | 502/185 |
| 7,935,655 B2 * | 5/2011 | Tolmachev | 502/326 |
| 8,648,004 B2 * | 2/2014 | Kuo et al. | 502/184 |
| 2001/0054769 A1 * | 12/2001 | Raaijmakers et al. | 257/758 |
| 2002/0127170 A1 * | 9/2002 | Hong et al. | 423/447.3 |
| 2005/0079349 A1 * | 4/2005 | Hampden-Smith et al. | 428/402 |
| 2006/0193978 A1 * | 8/2006 | Toth | 427/212 |
| 2007/0065699 A1 | 3/2007 | Larson et al. | |
| 2007/0243446 A1 | 10/2007 | Hamrock et al. | |
| 2013/0273246 A1 * | 10/2013 | Chisholm et al. | 427/212 |
| 2014/0087939 A1 * | 3/2014 | Kim et al. | 502/185 |

OTHER PUBLICATIONS

Yougui Chen et al.: "Nitrogen Doping Effects on Carbon Nanotubes and the Origin of the Enhanced Electrocatalytic Activity of Supported Pt for Proton-Exchange Membrane Fuel Cells", The Journal of Physical Chemistry C, vol. 115, pp. 3769-3776 (2011).

Z. Wen, J. Liu, and J. Li: "Core/Shell Pt/C Nanoparticles Embedded in Mesoporous Carbon as a Methanol-Tolerant Cathode Catalyst in Direct Methanol Fuel Cells", Advanced Materials, vol. 20, pp. 743-747 (2008).

* cited by examiner

METHOD FOR PREPARING FUEL CELL ELECTRODE CATALYST BY SIMULTANEOUS EVAPORATION, METHOD FOR PREPARING FUEL CELL ELECTRODE COMPRISING CATALYST PREPARED THEREBY AND FUEL CELL COMPRISING THE SAME

CROSS-REFERENCE TO RELATED APPLICATION(S)

This Application claims priority to Korean Patent Application No. 10-2012-0066013, filed on Jun. 20, 2012, the disclosure of which is incorporated by reference in its entirety.

BACKGROUND OF THE INVENTION

1. Field of the Invention

The present invention relates to a method for preparing a fuel cell electrode catalyst by simultaneous evaporation, a method for preparing a fuel cell electrode comprising the catalyst prepared thereby, and a fuel cell comprising the same, and more particularly to a method of preparing a fuel cell electrode catalyst by preparing a platinum-carbon core-shell composite, which has a platinum nanoparticle core and a carbon shell, using a simultaneous evaporation process, a method for preparing a fuel cell electrode comprising the catalyst prepared thereby, and a fuel cell comprising the same.

2. Description of the Prior Art

In recent years, with the potential exhaustion of crude oil and the rise of crude oil prices, the development of new energy sources that do not generate pollutants has been required, and the development of fuel cells as new energy sources has been required. In order to commercialize the fuel cells, many studies have been conducted to improve the performance of electrode catalysts and reduce the cost of the electrode catalysts.

The biggest problems to be solved in order to commercialize electrode catalysts for fuel cells are to provide nano-sized platinum particles having the highest catalytic activity for use as the electrode catalysts and to improve the durability of the electrode catalysts by preventing the electrode catalysts from being corroded and detached as a result of long-term use. Particularly, because catalyst particles of precious metals such as platinum and gold show a strong tendency to agglomerate as the reaction temperature increases, studies focused on solving this problem are required. In order to solve this problem, additional treatments are required, including effectively adding a co-catalyst to main catalyst particles (decoration) or enhancing the interaction between a platinum catalyst and a catalyst support (strong metal-support interaction). In the case of a catalyst for a fuel cell electrode in which a platinum catalyst is mainly used, the deactivation of the catalyst is more serious, and in addition to the agglomeration of the catalyst particles, the deactivation of the catalyst, which results from the corrosion or detachment of the catalyst particles during driving of the electrode, is very serious. In order to solve such problems, various studies have been conducted until recently. Particularly, the results of studies focused on improving the durability of electrode catalysts by highly dispersing platinum catalysts, preventing the corrosion of electrodes and the detachment of catalysts by the modification of carbon supports, or alloying platinum particles, have been reported. However, satisfactory results have not yet been reported, and a solution for fundamentally improving the performance and durability of platinum catalysts has not yet been proposed.

SUMMARY OF THE INVENTION

It is an object of the present invention to provide a method for preparing a high-performance, high-durability electrode catalyst for a fuel cell, in which the method is suitable for preparing a large amount of the electrode catalyst by a one-step process using a simultaneous evaporation process and can reduce the production cost, and the prepared electrode catalyst is not deactivated even when it is applied to an electrode reaction for a long period of time, because a part or the whole of the surface of platinum nanoparticles is surrounded by a carbon shell having a graphene structure.

Another object of the present invention is to provide a high-performance, high-durability electrode for a fuel cell, which comprises the above electrode catalyst supported on a support.

Another object of the present invention is to provide a fuel cell wherein a platinum-carbon core-shell composite prepared by a simultaneous evaporation process is applied to an electrode catalyst layer.

The present inventors have conducted extensive studies on a platinum-based electrode catalyst for a fuel cell, and as a result, have found that, when a platinum-carbon core-shell composite prepared by a simultaneous evaporation method is used as an electrode catalyst for a fuel cell, it has excellent performance and durability, and ultimately, the performance of the fuel cell is improved, thereby completing the present invention.

In accordance with one aspect of the present invention, there is provide a method for preparing an electrode catalyst for a fuel cell, the method comprising the steps of: (S1) evaporating a platinum precursor and an organic precursor for formation of a carbon framework in their evaporators; (S2) supplying each of the evaporated platinum precursor and organic precursor to a reactor by carrier gas in a non-contact state; and (S3) heating the reactor, and then maintaining the reactor at a constant temperature to synthesize a platinum-carbon composite having a core-shell structure.

In accordance with another aspect of the present invention, there is provided a method for preparing a fuel cell electrode, the method comprising the steps of: (S1) placing a support in a reactor; (S2) evaporating platinum precursor and an organic precursor for formation of a carbon framework in their evaporators; (S3) supplying each of the evaporated platinum precursor and organic precursor to the reactor, which has the support placed therein, by carrier gas in a non-contact state; and (S4) heating the reactor, and then maintaining the reactor at a constant temperature to synthesize a platinum-carbon composite supported on the support.

In accordance with still another aspect of the present invention, there is provided a fuel cell comprising an anode, a cathode and a polymer electrolyte, each of the anode and the cathode being composed of a support, a diffusion layer and a catalyst layer, which are sequentially stacked in that order, wherein the catalyst layer of at least one of the anode and the cathode is composed of a platinum-carbon composite having a core-shell structure.

BRIEF DESCRIPTION OF THE DRAWINGS

The above and other objects, features and advantages of the present invention will be more clearly understood from the following detailed description taken in conjunction with the accompanying drawing, in which:

FIG. 6 is a graphic diagram showing the results of testing the electrical performance of a fuel cell using a fuel cell electrode of Example 7, in which FIG. 6a shows catalytic performance in an initial state, and FIG. 6b shows catalytic performance after 1,000 cycles; and FIG. 7 is a graphic diagram showing the results of testing the electrical performance of a fuel cell using a fuel cell electrode according to the prior art, in which FIG. 7a shows catalytic performance in an initial state, and FIG. 7b shows catalytic performance after 1,000 cycles.

DETAILED DESCRIPTION OF THE INVENTION

Figure 1:
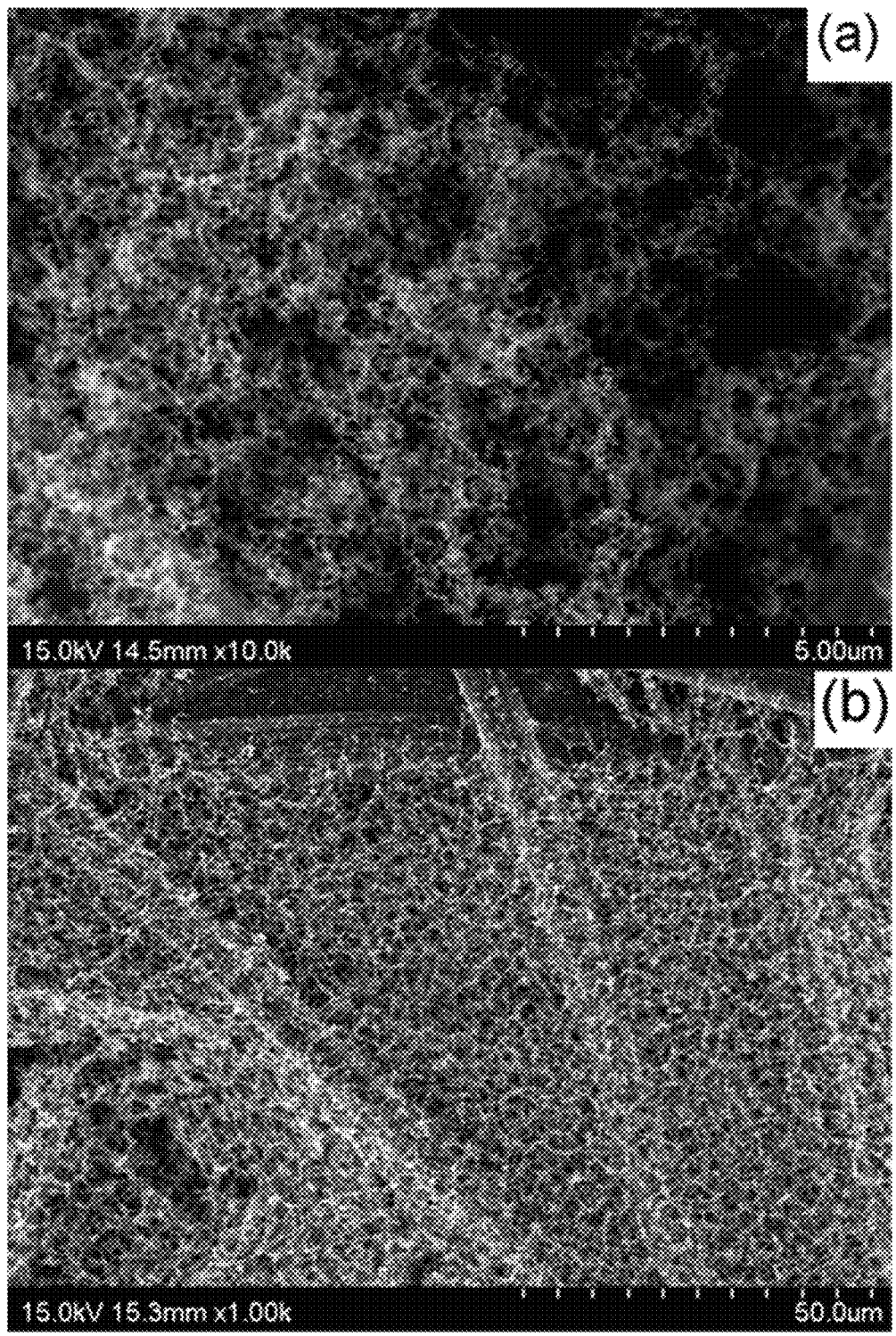
FIG. 1 is a set of SEM photographs showing a platinum-carbon core-shell composite (FIG. 1a) prepared in Example 1, and a fuel cell electrode (FIG. 1b) prepared in Example 7.

Hereinafter, the present invention will be described in further detail.

According to one aspect of the present invention, an electrode catalyst for a fuel cell may be prepared in the form of independent powder. Specifically, the inventive method for preparing an electrode catalyst for a fuel cell comprises the steps of: (S1) evaporating a platinum precursor and an organic precursor for formation of a carbon framework in their evaporators; (S2) supplying each of the evaporated platinum precursor and organic precursor to a reactor by carrier gas in a non-contact state; and (S3) heating the reactor, and then maintaining the reactor at a constant temperature to synthesize a platinum-carbon heterogeneous composite.

First, a platinum precursor and an organic precursor for formation of a carbon framework are evaporated in their evaporators (step S1).

In this step, the platinum precursor and the organic precursor can be simultaneously evaporated by supplying the platinum precursor to an evaporator, supplying the organic precursor to another evaporator, and then increasing the temperature of each evaporator to a temperature near the boiling point of each of the precursors. When a gaseous organic precursor is used, it can be provided in the evaporator without performing a separate evaporation process.

The platinum precursor that is used in the present invention is a precursor for platinum which forms the core of the final heterogeneous composite, and it may be any material that can evaporate. Preferably, the platinum precursor that is used in the present invention may be selected from the group consisting of (trimethyl)methylcyclopentadienyl platinum, platinum (II) acetylactonate, tetrakis(trifluorophosphine) platinum(0), tetrakis(triphenylphosphine) platinum(0), platinum(II) hexafluoroacetylacetonate, trimethyl(methylcyclopentadienyl) platinum(IV), and (1,5-cyclooctadiene)dimethyl platinum (II). More preferably, a precursor, which has a low boiling point and easily evaporates at room temperature, is used, and in this case, the process cost can be reduced and it is possible to minimize a problem of condensation or coating in a connection pipe for transferring the precursor to the reactor.

The organic precursor that is used in this step is a precursor for carbon which forms the shell of the final heterogeneous composite, and it may be any hydrocarbon-based precursor containing carbon. Preferably, it may be a liquid precursor selected from the group consisting of methanol, ethanol, acetone, benzene, toluene and xylene or may be a gaseous precursor such as methane or acetylene.

The evaporator that is used in this step may be a known evaporator or a manufactured evaporator. Generally, the evaporator may be made of platinum or glass (quartz glass or Pyrex). It is advantageously made of glass, because it makes it possible to observe the appearance and amount of the content of the evaporator while maintaining a constant temperature and does not react with the precursor.

Specific conditions for evaporation of the precursor in this step depend on the kind of platinum precursor selected. In an embodiment of the present invention, when (trimethyl)methylcyclopentadienyl platinum is used as the platinum precursor, it may be evaporated at a temperature of 50~70° C., and when acetone is used as the organic precursor, it may be evaporated at a temperature of 50~60° C. In another embodiment of the present invention, when (1,5-cyclooctadiene) dimethyl platinum(II) is used as the platinum precursor, it may be evaporated at a temperature of 100° C. or higher in a state in which it is dissolved in a solvent such as acetone. In this case, the evaporation can be performed either by placing an evaporator made of glass in an oven and heating the evaporator or by heating a heating tape wound around a connection pipe, which connects a metering pump to a reactor, while transferring a specific amount of a precursor solution by the metering pump.

Next, each of the platinum precursor and the organic precursor, evaporated in step S1, is supplied to a reactor by carrier gas in a non-contact state (step S2).

In this step, carrier gas containing each precursor in a gas state is supplied to a reactor in a non-contact state, for example, by a separate supply line. Thus, the evaporated precursors finally meet each other in the inlet of a reactor in which they react. If the precursors meet each other in the transfer channel, an undesired side reaction can occur or the wall of the transfer channel can undesirably be coated with the precursors.

The carrier gas that is used in this step serves to prevent the condensation or side reaction of the precursors and may be oxygen, hydrogen or nitrogen gas. Preferably, the carrier gas may be inert gas such as nitrogen, argon or helium in order to minimize a side reaction which can occur when the platinum precursor moves through the connection pipe.

The appearance of the final composite can be controlled by controlling the ratio of the flow rates of the precursors that are supplied to the reactor. Generally, the ratio of the flow rate of the platinum precursor to the organic precursor may be controlled in the range of 0.2 (platinum precursor: organic precursor=1:5) to 10 (platinum precursor: organic precursor=10:1). For example, the ratio of the flow rates of the two precursors (platinum precursor and organic precursor) is maintained at 2:1, the thickness of a carbon shell and the number of graphite layers decrease compared to those when the ratio of the flow rates of the two precursors is 1:1. Thus, various types of platinum-carbon composites which can be used as electrode catalysts for fuel cells can be synthesized by changing the ratio of the flow rates of the precursors depending on the intended use of the composites. Generally, it is advantageous for a catalytic reaction to reduce the thickness of the carbon shell. The platinum-carbon composite according to the present invention is preferably used either as a catalyst in a general catalytic reaction or as an electrode material for fuel cells, secondary batteries or solar cells and is configured to prevent the agglomeration of the platinum particles and prevent the platinum particles from being corroded or detached with the progression of the reaction. Thus, when the carbon shell of the platinum-carbon composite is as thin as about 1-3 layers, the catalytic reaction activity will be increased compared to when the carbon shell is thick. In addition, when the platinum-carbon composite is used as a catalyst for a gaseous reaction, a gas-phase reactant will contact and react with the core portion (platinum catalyst) in the defect portion of the carbon shell, and thus the carbon shell is preferably an amorphous carbon shell having many defects. Further, when the number of the carbon shells is large, a gas-phase reactant can be difficult to difficult to come into come with the platinum particles, and for this reason, the number of the carbon shells is preferably small. When the platinum-carbon composite is used as an electrode material for fuel cells, secondary batteries or solar cells in which ions or electrons migrate through the carbon shell of the platinum-carbon core-shell structure, it advantageously has a carbon shell having a graphite or graphene structure rather than an amorphous carbon shell, because it increases the physical and chemical durability of the platinum-carbon composite particles. In this case, the carbon shell is advantageously thin in order to facilitate the smooth migration of ions and electrons.

In an embodiment of the present invention, each of the precursors evaporated in an oven maintained at a certain temperature is transferred to the reactor through gas movement channels which are wound with hot wires in order to prevention condensation. When each of the precursors is supplied to the reactor, the temperature thereof is preferably maintained at a temperature near the boiling point thereof.

Finally, the reactor, to which each of the precursors was supplied in step S2, is heated, and then is maintained at a constant temperature, whereby a platinum-carbon composite having a core-shell structure can be prepared in the form of powder (S3). Reaction conditions for synthesis of the platinum-carbon core-shell composite in this step depend on the kinds of platinum and organic precursors. Generally, the synthesis reaction is easily performed at a temperature of about 300° C. or above. When a quartz glass reactor is used, the synthesis reaction temperature is preferably in the range from 300 to 1,100° C., and when an alumina tube or graphite reactor is used, the synthesis may be performed at a temperature of up to 1,800° C., and a temperature higher than 1,800° C. may also be applied when a suitable heating furnace and reactor are designed. As the synthesis temperature increases, the number of defects in the shells around the platinum particles decreases and the crystallinity of the shells increases. The synthesis time is 5 minutes or more, and preferably about 1 hour or more. However, it is obvious that the amount of the platinum-carbon composite increases as the synthesis time increases.

The fuel-cell electrode catalyst has a structure in which a part or the whole of the surface of the platinum core is surrounded by the carbon shell. Thus, even when the electrode catalyst is applied to a catalytic reaction process in a fuel cell for a long period of time under severe conditions such as high temperature, acidic and alkaline conditions, it can have high performance and high durability, because the platinum particles are not agglomerated, detached or corroded.

In accordance with another aspect of the present invention, a fuel cell electrode comprising a platinum-carbon core-shell composite supported on a support can be prepared using a simultaneous evaporation process and a support. Specifically, the inventive method for preparing a fuel cell electrode comprises the steps of: (S1) placing a support in a reactor; (S2) evaporating platinum precursor and an organic precursor for formation of a carbon framework in their evaporators; (S3) supplying each of the evaporated platinum precursor and organic precursor to the reactor, which has the support placed therein, by carrier gas in a non-contact state; and (S4) heating the reactor, and then maintaining the reactor at a constant temperature to synthesize a platinum-carbon core-shell composite supported on the support.

The support that is used in the present invention is carbon fiber paper or graphite fiber paper which is used as a fuel cell electrode, and the thickness, porosity and size thereof are not specifically limited. Various types of carbon paper may be used in the present invention.

This embodiment of the present invention differs from the above-described embodiment in that carbon paper to be used as a fuel cell electrode is previously placed in the reactor and the platinum-carbon composite which is the final product is highly dispersed and supported on the carbon paper. The particulars of steps S2 to S4 are as described above.

According to this embodiment, a fuel cell electrode can be prepared in which a platinum-carbon composite, which has a core formed of platinum and a shell formed of carbon and in which a part or the whole of the core is surrounded by the carbon shell, is supported on a support. The fuel cell electrode according to the present invention comprises the platinum-carbon core-shell composite supported on the support, and thus the preparation thereof does not require a multi-step process. In addition, the fuel cell electrode having high performance is synthesized by a one-step process, and thus the preparation process is simplified, the process cost is reduced, and the electrode performance and durability are improved.

The present invention also provides a fuel cell comprising an anode, a cathode and a polymer electrolyte, each of the anode and the cathode being composed of a support, a diffusion layer and a catalyst layer, which are sequentially stacked in that order, wherein the catalyst layer of at least one of the anode and the cathode is composed of a platinum-carbon composite having a core-shell structure.

The platinum-carbon composite having the core-shell structure can be prepared by providing a platinum precursor and an organic precursor for formation of a carbon framework using the simultaneous evaporation process according to the present invention, that is, evaporating the platinum precursor and the organic precursor in their evaporators, supplying each of the evaporated platinum precursor and organic precursor to a reactor by carrier gas in a non-contact state, heating the reactor, and then maintaining the temperature of the reactor at a constant temperature to prepare a platinum-carbon composite in a powder form.

A fuel cell according to the present invention can be fabricated by preparing an anode and a cathode, which comprise a fuel-cell electrode catalyst layer consisting of the inventive platinum-carbon composite having a core-shell structure, and interposing a polymer electrolyte membrane between the anode and the cathode. The fuel cell comprising the catalyst of the present invention can have high performance and high durability, because the platinum particles are not agglomerated or detached and corroded during a catalytic reaction.

Hereinafter, the present invention will be described in further detail with reference to examples. However, these examples are for illustrative purposes and those skilled in the art will appreciate that various modifications, additions and substitutions are possible, without departing from the scope and spirit of the invention as disclosed in the accompanying claims.

EXAMPLES 1 to 6

Preparation of Electrode Catalyst for Fuel Cell

As a platinum precursor, methylcyclopentadienyl platinum (MeCpPtMe$_3$) was used, and as a carbon precursor, acetone (99.8%, Merck) was used. A quartz filter was placed in a quartz tube (1 inch) in order to capture a metal-carbon composite, and the inside of the quartz tube was maintained at 120° C. for 2 hours in a nitrogen atmosphere to remove water and impurities. Herein, the inside of each of two evaporators placed in ovens was maintained in a nitrogen atmosphere, and inlet and outlet corks were all closed, and in this state, nitrogen was passed through a bypass line for 30 minutes or more without passage through the evaporators to impurities from a reactor.

Next, the reactor was heated to 400° C. at a rate of 10° C./min to make composite synthesis conditions, and at a time point when the temperature of the reactor reached the desired reaction temperature, the temperature of oven 1 provided with the evaporator containing the platinum precursor was elevated to 60° C., and the temperature of oven 2 containing acetone was elevated to 55° C. At a time point when the temperatures of each precursor and the reactor reached the desired temperatures, the cork of each evaporator was opened so that carrier gas including each evaporated precursor reached the reactor. Herein, nitrogen was used as the carrier gas. 40 sccm of nitrogen was passed through oven 1 containing the platinum precursor, and 20 sccm of nitrogen was passed through oven 2 containing acetone, and 40 sccm of nitrogen was additionally passed through the reactor by a separate line. At a time point when the cork was opened, the synthesis reaction started and a reaction time of 2 hours from that time point was maintained, thereby a core-shell platinum-carbon composite which can be used as an electrode catalyst for a fuel cell.

EXAMPLE 2

A platinum-carbon composite having a core-shell structure was synthesized in the same manner as Example 1, except that the synthesis temperature of the platinum-carbon composite was changed from 400° C. to 600° C.

EXAMPLE 3

A platinum-carbon composite having a core-shell structure was synthesized in the same manner as Example 1, except that the synthesis temperature of the platinum-carbon composite was changed from 400° C. to 1,100° C.

EXAMPLE 4

A platinum-carbon composite having a core-shell structure was synthesized in the same manner as Example 1, except that the synthesis temperature of the platinum-carbon composite was changed from 400° C. to 600° C.

EXAMPLE 5

A platinum-carbon composite having a core-shell structure was synthesized in the same manner as Example 1, except that acetylene was used as the organic precursor and the synthesis temperature of the platinum-carbon composite was changed from 400° C. to 600° C.

EXAMPLE 6

A platinum-carbon composite having a core-shell structure was synthesized in the same manner as Example 1, except that the platinum precursor and the organic precursor were supplied to the reactor at a flow rate ratio of 5:1 (i.e., platinum precursor: 40 sccm, and organic precursor: 8 ppm).

EXAMPLE 7

Preparation of Fuel Cell Electrode Comprising Platinum-Carbon Core-Shell Composite Supported on Carbon Paper As a platinum precursor, methylcyclopentadienyl platinum ($MeCpPtMe_3$) was used, and as a carbon precursor, acetone (99.8%, Merck) was used. In order to capture a metal-carbon composite, a quartz tube (inner diameter: 75 mm) was provided and a quartz filter was placed in the central portion of the quartz tube, after which carbon paper (Toray, TGP-H-060) having a size of 70 mm×70 mm was placed in the center of the quartz filter. The inside of the quartz tube was maintained at 120° C. for 2 hours in a nitrogen atmosphere to remove water and impurities. Herein, the inside of each of two evaporators placed in ovens was maintained in a nitrogen atmosphere, and inlet and outlet corks were all closed, and in this state, nitrogen was passed through a bypass line for 30 minutes or more without passage through the evaporators to impurities from a reactor.

Next, the reactor was heated to 400° C. at a rate of 10° C./min to make composite synthesis conditions, and at a time point when the temperature of the reactor reached the desired reaction temperature, the temperature of oven 1 provided with the evaporator containing the platinum precursor was elevated to 60° C., and the temperature of oven 2 containing acetone was elevated to 55° C. At a time point when the temperatures of each precursor and the reactor reached the desired temperatures, the cork of each evaporator was opened so that carrier gas including each evaporated precursor reached the reactor having the carbon paper placed therein. Herein, nitrogen was used as the carrier gas. 60 sccm of nitrogen was passed through oven 1 containing the platinum precursor, and 30 sccm of nitrogen was passed through oven 2 containing acetone, and 100 sccm of nitrogen was additionally passed through the reactor by a separate line. At a time point when the cork was opened, the synthesis reaction started and a reaction time of 2 hours from that time point was maintained, thereby preparing a fuel cell electrode having platinum-carbon core-shell nanoparticles supported thereon.

TEST EXAMPLE 1

Scanning Electron Microscopic (SEM) Analysis

The platinum-carbon core-shell composite prepared in Example 1 and the fuel cell electrode having the platinum-carbon core-shell nanoparticles supported thereon, prepared in Example 7, were analyzed using a scanning electron microscope (SEM), and the results of the analysis are shown in FIG. 1. As a result, it could be seen that the platinum-carbon composite could be effectively synthesized in a state supported on nano-powder or carbon paper and was advantageous for preparing the nanoparticles or the fuel cell electrode having the nanoparticles supported thereon, because particles were not attached to the wall side of the quartz tube reactor. Such results suggest that the affinity of the platinum-carbon nanoparticles for quartz is lower than that for other materials.

TEST EXAMPLE 2

Transmission Electron Microscopic (TEM) Analysis

Figure 2:
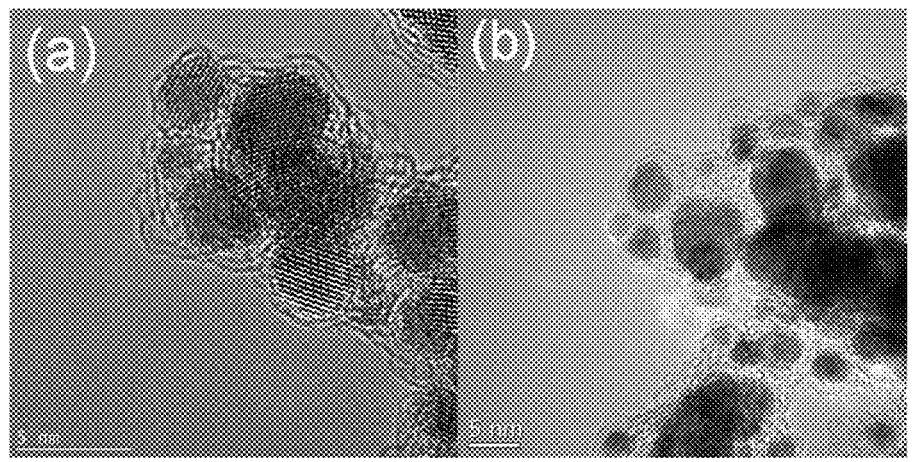
FIG. 2 is a set of transmission electron micrographs of platinum-carbon composites prepared in Example 1 (FIG. 2a) and Example 3 (FIG. 2b)

The platinum-carbon core-shell composites prepared in Examples 1 and 3 were analyzed using a transmission electron microscope, and the results of the analysis are shown in FIG. 2. FIG. 2 is a set of TEM photographs of platinum-carbon core-shell structures prepared at different synthesis temperatures while maintaining the flow rates of the platinum precursor and the organic precursor at constant levels. From FIG. 2, it can be seen that the platinum-carbon composite synthesized in the present invention has a core-shell structure in which platinum is located at the center and the carbon layer (i.e., graphite layer) is located at the periphery. The carbon shell located at the periphery consisted of about 1-4 graphite layers, and when the same organic precursor was used, the number of carbon shells or the degree of defects could be controlled by controlling the synthesis temperature and the ratio of the flow rates of the precursors. Specifically, FIG. 2a show the results of synthesis performed at 400° C. in Example 1, and FIG. 2b shows the results of synthesis performed at 1,100° C. in Example 3. It can be seen that, in the composite of FIG. 2b synthesized at high temperature, the carbon shell had a reduced number of defects and was smooth.

Figure 3:
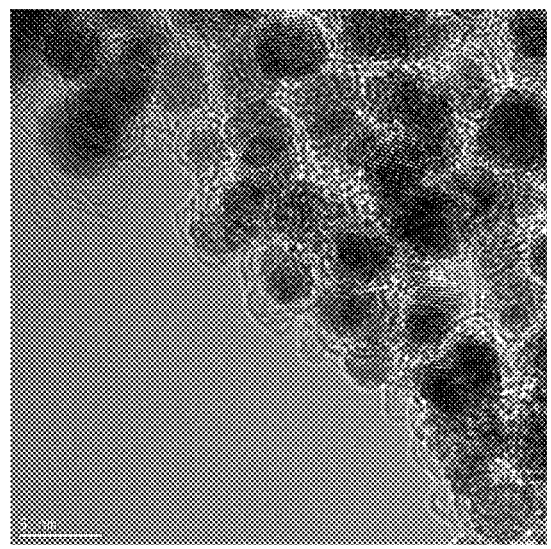
FIG. 3 is a transmission electron micrograph of a platinum-carbon core-shell composite prepared in Example 4.
Figure 4:
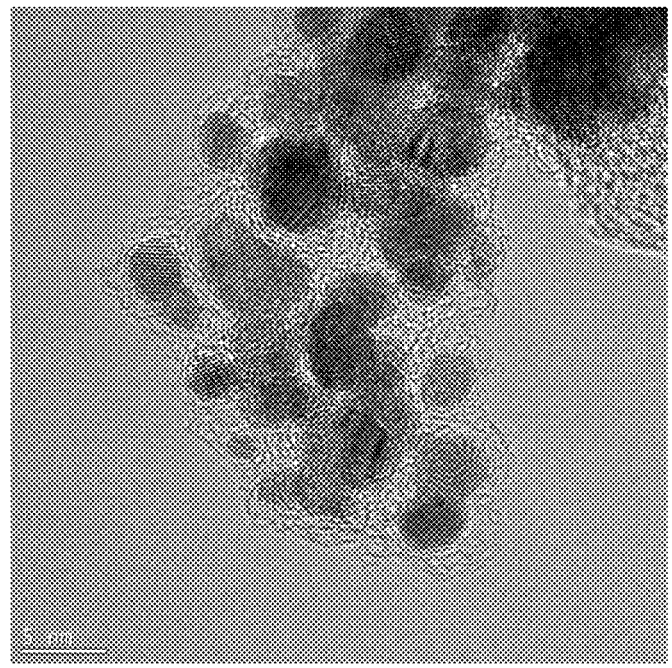
FIG. 4 is a transmission electron micrograph of a platinum-carbon core-shell composite prepared in Example 5.

Meanwhile, the thickness of the carbon shell and the degree of defects therein vary depending on the characteristics of the organic precursor. In order to confirm this fact, in Example 4, a platinum-carbon core-shell structure was synthesized at 600° C. using methane as the organic precursor, and in Example 5, the synthesis reaction was performed at 600° C. using acetylene as the organic precursor. As a result, it was shown that an organic precursor having a larger number of carbon atoms, that is, the acetylene precursor, showed an increase in the thickness of the carbon shell compared to the methane precursor. Specifically, as shown in FIG. 3, the number of layers in the carbon shell of the platinum-carbon composite synthesized at 600° C. using methane ($CH_4$) was 1-2, but as shown in FIG. 4, the number of layers in the carbon shell of the platinum-carbon composite synthesized at the same temperature using acetylene was 3-6.

Figure 5:
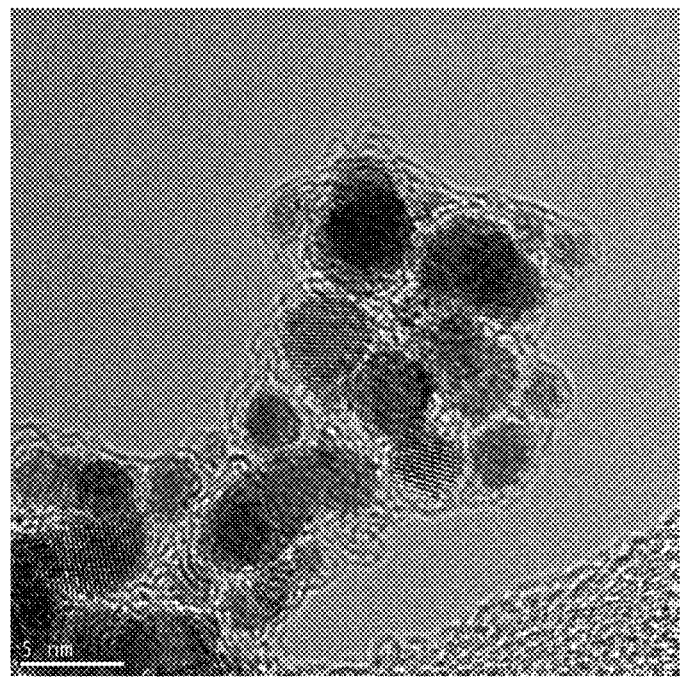
FIG. 5 is a transmission electron micrograph of a platinum-carbon core-shell composite prepared in Example 6.

In addition, as the ratio of the flow rate of the organic precursor to the flow rate of the platinum precursor decreases, the thickness of the carbon shell can decrease. In order to examine this fact, in Example 6, synthesis was performed in a state in which the ratio of the flow rate of the organic precursor (acetone) to the flow rate of the platinum precursor was decreased from 0.5 in Example 1 to 0.2. As a result, as can be seen in FIG. 5, the number of layers in the carbon shell of the platinum-carbon composite decreased to about 1-2.

TEST EXAMPLE 3

Test for Characteristics of Fuel Cell

The electrochemical performance and durability of a fuel cell electrode comprising each of the fuel cell electrode prepared in Example 7 and a conventional catalyst (Pt/C, 20 wt % Pt, Johnson Matthey) were tested. To test the electrochemical performance, a rotating disk electrode (hereinafter referred to as RDE) was coated with the synthesized nanoparticles and analyzed by cyclic voltammetry (CV) using a potentiostat (Biologic sp-50). The CV analysis was performed using an aqueous solution of 0.5 M $H_2SO_4$ and a normal hydrogen electrode as a reference at a potential of 0-1.2 V and at a scan rate of 20 mV/s.

Figure 6:
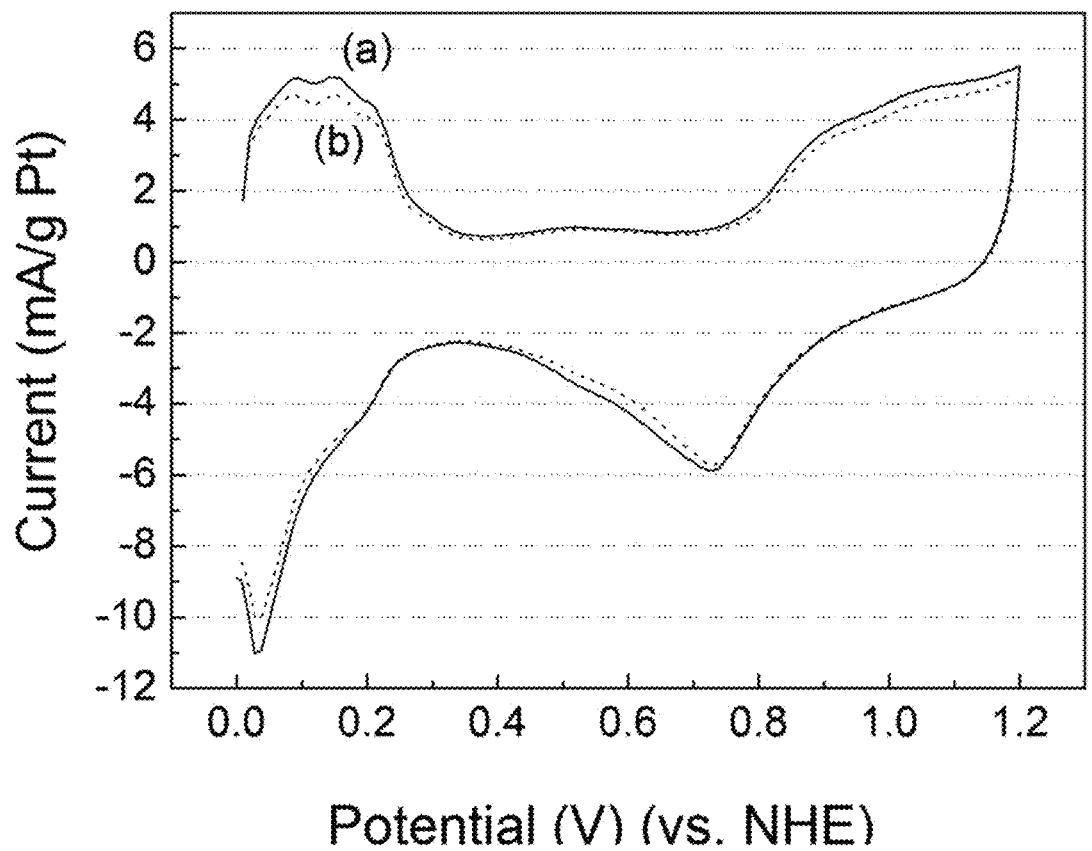
Figure 7:
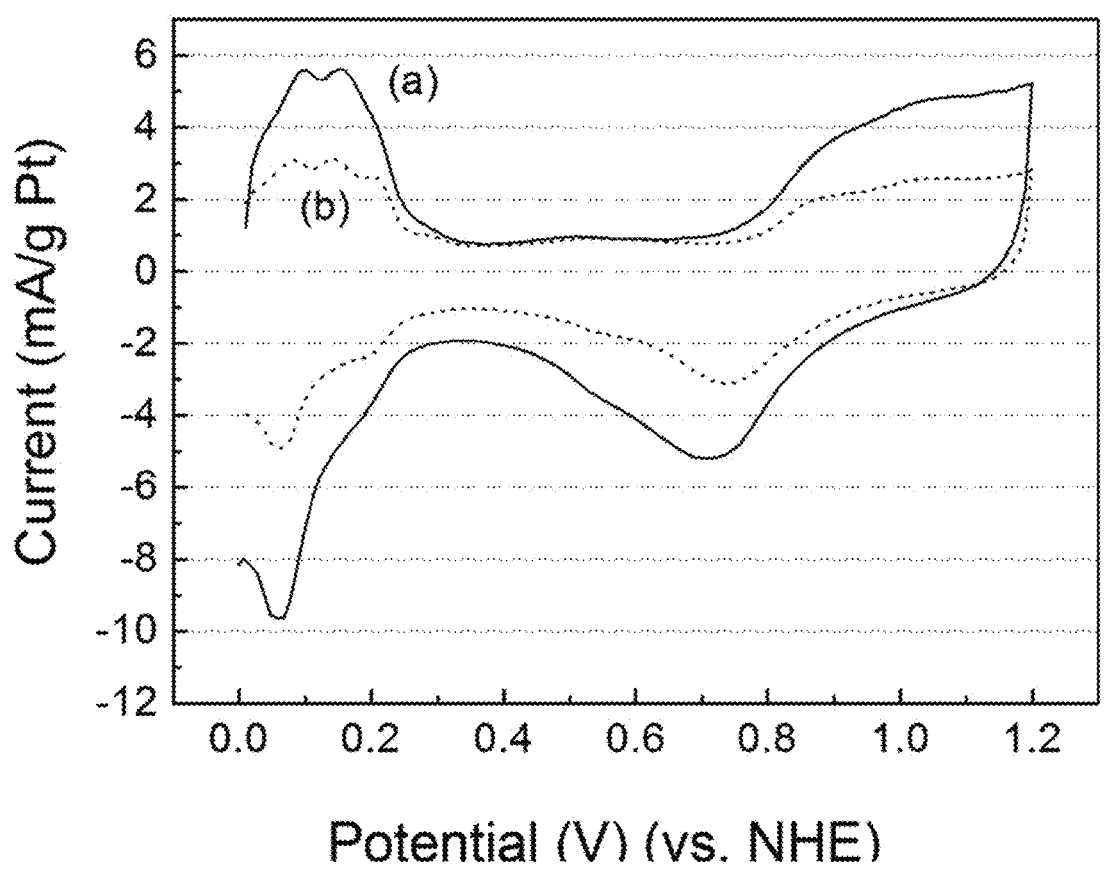

As a result, it was shown that, when the RDEs were coated with the same amount of platinum (0.3 mg Pt/$cm^2$), the initial activity of the platinum-carbon core-shell catalyst was about 8% lower than that of the conventional catalyst. This is because the surface of the platinum-carbon core-shell catalyst particles is partially covered by carbon, and thus has a smaller number of catalytic sites, even though the platinum-carbon core-shell catalyst particles have a smaller particle size and are highly dispersed compared to the conventional platinum catalyst. However, in a 1,000-cycle test performed to measure the durability of the platinum catalyst, it was shown that the platinum-carbon core-shell structure maintained about 89% of the initial activity after 1,000 cycles, whereas the conventional catalyst maintained about 55% of the initial activity after 1,000 cycles. Such results are shown in FIGS. 6 and 7 and demonstrate that the platinum-carbon core-shell structure shows a significantly high long-term stability in an electrode reaction in a fuel cell.

As described above, a fuel cell comprising an electrode catalyst consisting of the core-shell composite prepared by simultaneously evaporating the platinum precursor and the organic precursor can have high performance and high durability, because the platinum particles are not agglomerated or detached and corroded even under severe conditions, including high-temperature, long use term, acidic and alkaline conditions. In addition, according to the inventive method for preparing the fuel cell electrode catalyst, catalysts having various properties can be synthesized through a very simple process without a separate post-treatment process using various compositions at various temperatures.

Although the preferred embodiments of the present invention have been described for illustrative purposes, those skilled in the art will appreciate that various modifications, additions and substitutions are possible, without departing from the scope and spirit of the invention as disclosed in the accompanying claims.

What is claimed is:

1. A method for preparing a fuel cell electrode material, the method comprising the steps of:
   (S1) evaporating a platinum precursor and an organic precursor for formation of a carbon framework in their evaporators;
   (S2) supplying each of the evaporated platinum precursor and organic precursor to a reactor by carrier gas in a non-contact state; and
   (S3) heating the reactor, and then maintaining the reactor at a constant temperature to synthesize a platinum-carbon composite having a core-shell structure.

2. The method of claim 1, wherein the platinum precursor is selected from the group consisting of (trimethyl)methylcyclopentadienyl platinum, platinum(II) acetylacetonate, tetrakis (trifluorophosphine) platinum(0), tetrakis (triphenylphosphine) platinum(0), platinum(II) hexafluoroacetylacetonate, trimethyl(methylcyclopentadienyl) platinum(IV), and (1,5-cyclooctadiene)dimethyl platinum(II).

3. The method of claim 1, wherein the organic precursor for formation of the carbon framework is selected from the group consisting of methanol, ethanol, acetone, benzene, toluene and xylene.

4. The method of claim 1, wherein the organic precursor for formation of the carbon framework is methane or acetylene.

5. The method of claim 1, wherein the carrier gas is oxygen, hydrogen, argon, helium or nitrogen gas.

6. The method of claim 1, wherein the evaporated precursors in step S2 are maintained at temperatures near the boiling points thereof.

7. The method of claim 1, wherein the reactor in step S3 is heated at a temperature of 300° C. or above.

8. The method of claim 1, wherein the platinum precursor and the organic precursor are supplied to the reactor in step S3 in a state in which the ratio of the flow rate of the platinum precursor to the flow rate of the organic precursor is in the range from 0.2 to 10.

9. The method of claim 1 and further comprising placing a support in the reactor, wherein supplying each of the evaporated platinum precursor and organic precursor to the reactor is performed with the support placed in the reactor.

10. The method of claim 9, wherein the support is carbon paper.

11. The method of claim 9, wherein the platinum precursor is selected from the group consisting of (trimethyl)methylcyclopentadienyl platinum, platinum(II) acetylacetonate, tetrakis(trifluorophosphine) platinum(0), tetrakis(triphenylphosphine) platinum(0), platinum(II) hexafluoroacetylacetonate, trimethyl(methylcyclopentadienyl) platinum(IV), and (1,5-cyclooctadiene)dimethyl platinum(II).

12. The method of claim 9, wherein the organic precursor for formation of the carbon framework is selected from the group consisting of methanol, ethanol, acetone, benzene, toluene and xylene.

13. The method of claim 9, wherein the organic precursor for formation of the carbon framework is methane or acetylene.

14. The method of claim 9, wherein the carrier gas is oxygen, hydrogen, argon, helium or nitrogen gas.

15. The method of claim 9, wherein the evaporated precursors in step S2 are maintained at temperatures near the boiling points thereof.

16. The method of claim 9, wherein the reactor in step S3 is heated at a temperature of 300° C. or above.

17. The method of claim 9, wherein the platinum precursor and the organic precursor are supplied to the reactor in step S3 in a state in which the ratio of the flow rate of the platinum precursor to the flow rate of the organic precursor is in the range from 0.2 to 10.

* * * * *